(Model.)
J. COLEMAN.
VEHICLE AXLE.
No. 351,425. Patented Oct. 26, 1886.
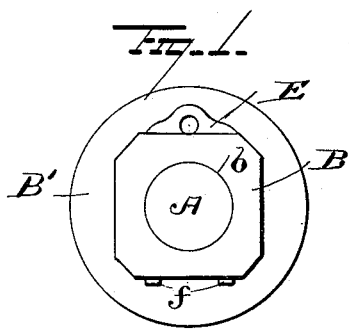
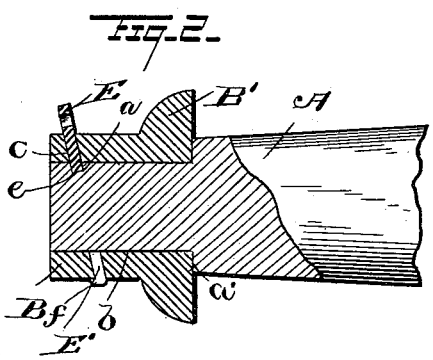
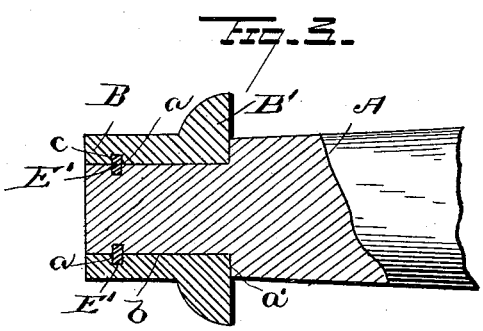
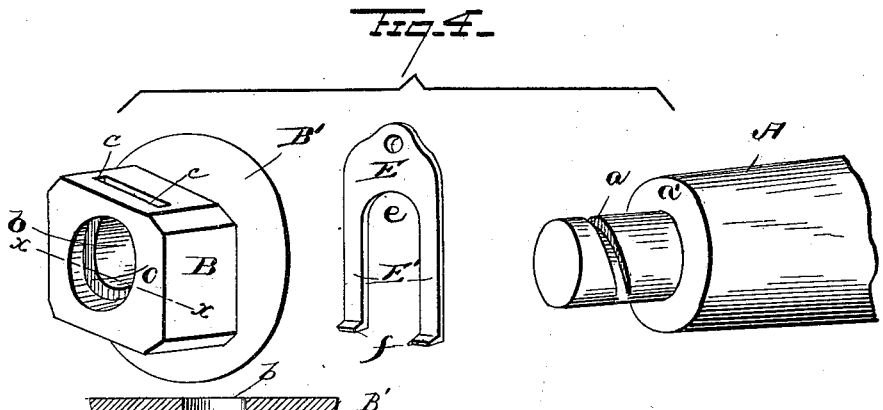
Witnesses  
Inventor  
John Coleman  
By his Attorneys

UNITED STATES PATENT OFFICE.

JOHN COLEMAN, OF LYNCHBURG, VIRGINIA.

VEHICLE-AXLE.

SPECIFICATION forming part of Letters Patent No. 351,425, dated October 26, 1886.

Application filed June 11, 1886. Serial No. 204,873. (Model.)

*To all whom it may concern:*

Be it known that I, JOHN COLEMAN, a citizen of the United States, residing at Lynchburg, in the county of Campbell and State of Virginia, have invented a new and useful Improvement in Axles, of which the following is a specification.

My invention relates to improvements in axles; and it consists of the peculiar construction and combination of the various parts for service, substantially as hereinafter fully set forth, and specifically pointed out in the claim.

The object of my invention is to provide means for preventing the axle-nut from becoming accidentally detached from the spindle of an axle when backing the vehicle or from other causes, and to provide such means which shall be simple and strong in construction, as well as durable and efficient, and which shall furthermore be cheap and inexpensive of manufacture, and easily and readily applied or adjusted for use.

In the accompanying drawings, which illustrate an axle embodying my invention, Figure 1 is an end elevation. Fig. 2 is a vertical central sectional view thereof. Fig. 3 is a horizontal sectional view of Fig. 2. Fig. 4 is a detached detail view in perspective of the parts of my improvement, showing the axle-spindle, the nut therefor, and the plate or slide for locking the nut on the axle. Fig. 5 is a horizontal sectional view through the nut on the line *x x* of Fig. 4.

Referring to the drawings, in which like letters of reference denote corresponding parts in all the figures, A designates the spindle of an axle of ordinary form, which is made smooth at its outer end, instead of being exteriorly threaded, as heretofore, and is provided with a circumferential groove or recess, *a*, which extends nearly around the entire periphery thereof, and is arranged in an inclined or diagonal position, as clearly shown.

B designates the axle-nut, which is fitted loosely on the spindle and provided with a flared shoulder or flange, B', which bears against the corresponding shoulder, *a'*, of the axle-spindle, and the said nut is made square or rectangular in form, as is usual, the transverse opening *b* thereof being smooth; or it may be interiorly threaded, as commonly practiced, which latter construction is very liable to loose the nut when backing the vehicle or from other causes, as is obvious. The nut is further provided with a vertical slot, *c*, that extends entirely across within the same and between the edges thereof, and this slot intersects with or opens into the tranverse opening *b* of the nut. The sides of these slots are enlarged or widened, as at *d*, to form grooves or ways, in which slide or move the lugs or flanges of a locking-plate, E, and the slot and the grooves or ways of the nut are also inclined or arranged diagonally and correspond with the inclination of the groove of the axle-spindle.

The locking-plate E is slotted or bifurcated for nearly its entire length to form the two connected arms E' and a space or opening between the arms, and these arms ride or slide freely in the slot of the axle-nut and straddle the spindle to retain the nut thereon against accidental displacement. The connected arms of the locking-plate are curved, rounded, or arch-shaped at their point of juncture, as at *e*, so as to conform to the shape of the axle-spindle, and this portion *e* of the arms and the inner opposing edges of the arms themselves fit snugly in the circumferential groove of the axle-spindle, and thus prevent the axle-nut from becoming displaced from the spindle. The arms of the locking-plate are provided at their free ends with lateral integral lugs or flanges *f*, which work or slide in the grooves or ways of the nut when the locking-plate is operated or adjusted, and these lugs abut against the ends of the grooves or ways when the locking-plate is withdrawn from the groove of the axle-spindle to prevent the said plate from being detached from the nut when the latter is removed from the axle. The nut is first placed on the axle-spindle and turned until the slots *c* therein align with the inclined peripheral groove *a* of the axle-spindle. The locking-plate is now pressed or forced down, so that the arms thereof pass through the slots of the nut, the inner opposing edges of the arms entering the peripheral groove of the spindle to prevent the nut from movement or play in either vertical or horizontal directions. The locking-plate assumes an inclined position corresponding with the inclination of the slot in the nut and the groove in the spindle, and the lower ends of the arms of the locking-plate extend or project beyond the nut. The arms of the locking-plate fit very snugly and closely in the slot of the nut and groove of the spindle, so that the parts cannot be displaced, and as the upper arched part of the slot in the locking-plate straddles or fits in the groove at the upper side of the spindle the locking-plate cannot descend or fall, which latter operation would withdraw it from the groove of the spindle and allow the nut to be detached.

To remove the nut, it is only necessary to elevate the locking-plate, and thus withdraw it from the groove of the axle-spindle, after which the nut can be easily taken off the spindle by hand.

The operation of my invention will be readily understood from the foregoing description, taken in connection with the drawings.

It will be seen that I provide safe and secure means for effectually locking the axle-nut in engagement with the axle-spindle, and that the parts are not liable to become displaced and detached, except by the hand of the operator when it is desired to remove the wheel to grease the axle-spindle or for other causes, in which case the locking-plate can be readily withdrawn to remove the nut from the spindle.

I am aware that it is not new to provide a wagon-axle with a channeled thimble-skein, a washer fitted thereon and having a number or series of studs that project from its sides, top and bottom edges, and a spring-key fitted on the skein in front of the washer and retained from displacement on the skein by the studs of the washer impinging against the same. I am also aware that it is not new to provide a hub-attaching device which comprises a channeled axle-spindle, a slotted band secured to the hub and surrounding the spindle, a locking-plate passing through the slot of the band and fitting in the channel of the axle-spindle, and springs connected to the locking-plate and bearing against the band to retain the plate from movement. My invention differs from these devices in that I provide a nut with a slot and with grooves $d$, opening into or communicating with the slot, and fit a locking-plate in the slot of the nut, so that projecting lugs or studs thereon will come in contact with the ends of the grooves, when the locking-plate is withdrawn within the nut, to prevent the said plate from being withdrawn wholly or detached from the nut.

Having thus fully described my invention, what I claim as new, and desire to secure by Letters Patent, is—

The combination of an axle-spindle having a groove in its periphery, a nut fitted on the spindle and provided with a slot, $c$, which registers with the groove of the spindle, and the grooves $d$, opening into the slot $c$, and a locking-plate fitted in the slot $c$ of the nut, and having the arms adapted to fit in the groove of and straddle the axle, the free ends of the arms of the locking-plate having the nibs or lugs, which ride in the grooves $d$ of the nut, all combined and arranged substantially as and for the purpose herein described.

In testimony that I claim the foregoing as my own I have hereto affixed my signature in presence of two witnesses.

JOHN COLEMAN.

Witnesses:
A. J. DEWITT,
W. R. MUSSER.